340-870.15 SR CROSS REFERENCE SEARCH ROOM

XR 3,150,302

MULTIPLEXING APPARATUS FOR PLURAL OUTPUT DEVICE CONTROL

Filed Jan. 6, 1960 2 Sheets-Sheet 1

INVENTOR.
JOSEPH J. BAUMOEL
BY Lester W. Clark
ATTORNEY

MULTIPLEXING APPARATUS FOR PLURAL OUTPUT DEVICE CONTROL

Filed Jan. 6, 1960 2 Sheets-Sheet 2

INVENTOR.
JOSEPH J. BAUMOEL
BY Lester W. Clark
ATTORNEY

United States Patent Office 3,150,302 Patented Sept. 22, 1964

3,150,302

MULTIPLEXING APPARATUS FOR PLURAL OUTPUT DEVICE CONTROL

Joseph J. Baumoel, Jericho, N.Y., assignor to The Liquidometer Corporation, Long Island City, N.Y., a corporation of Delaware Filed Jan. 6, 1960, Ser. No. 844
5 Claims. (Cl. 318—19)

This invention relates to multiplexing apparatus, and particularly to apparatus for connecting a plurality of electrical input networks or transmitters through a single amplifier to a corresponding plurality of receivers or output devices, e.g. motors, in such a way that each input network controls one particular output device and only one, and each output device is controlled by its one input network only.

The invention is described herein as applied to a system wherein each input network includes a capacitance bridge utilized to measure the liquid level in a tank, and each output device is a two-phase motor having one phase connected directly to a source of energy and the other phase supplied from the output of an amplifier whose input is connected to the input network. While certain features of the invention are of especial utility in connection with this specific input network and this specific output device, it will be readily understood by those skilled in the art that the broader principles of the invention are applicable to other types of input networks and to other types of output devices.

In multiplexing apparatus of the prior art, it has been customary to use mechanical selector switch means to close and open sequentially the circuits between the amplifier input and the various networks and coordinated mechanical selector switch means to close and open the circuits between the amplifier output and the various motors. Such mechanical switch means may introduce switching transients into the circuits. Such transients produce objectionable radio noise and may also subject parts of the apparatus to stresses which shorten their life and otherwise adversely affect their operation.

It is an object of the present invention to provide multiplexing apparatus of the type described in which the input terminals of the amplifier are permanently electrically connected to the several input networks and the output terminals of the amplifier are permanently electrically connected to the several output devices, and in which the sequential selection of particular input networks and particular output devices for cooperation with the amplifier during successive intervals is accomplished by selectively controlling the power supplies of the respective input networks and output devices.

Another object is to provide multiplexing apparatus in which the power supplies are controlled through the use of selectively energized saturable core reactors.

Another object is to provide multiplexing apparatus of the type described, in which the saturable core reactors are sequentially and selectively energized without the use of mechanically opened and closed contacts.

A further object of the invention is to provide high impedance to small currents in an electric circuit by connecting in series in the circuit two oppositely poled Zener diodes.

Another object of the invention is to provide multiplexing apparatus of the type described including, for each individual section of the apparatus, power supply means including a saturable core reactor having an output winding and two oppositely poled Zener diodes connected in series with the output winding.

The foregoing and other objects of the invention are attained in the apparatus described herein. In this apparatus, each motor and its associated input network are supplied with electrical energy through an individual power supply connection which includes a saturable reactor. Each saturable reactor has an input terminal connected to a common source of alternating current, an output terminal connected to its associated motor and input network, and a control winding. The control winding, when energized, permits the transfer of energy between the input and output terminals, and when deenergized effectively blocks that transfer of energy. Each control winding is supplied with electrical energy from the output of an AND circuit. Each AND circuit has a plurality of inputs connected to a distinctive combination selected from the direct and complementary outputs of a plurality of multivibrator stages forming a binary counting chain. The combinations of multivibrator ouputs feeding the several AND circuit inputs are selected so that only one of the saturable reactor control windings is energized at any one time. The outputs of the several networks are all connected in parallel to the amplifier input. The output of the amplifier is connected to the variable phase windings of all the motors in parallel.

Other objects and advantages of the invention will become apparent from a consideration of the following specification and claims, taken together with the accompanying drawings.

*FIG. 1*

Figure 1:
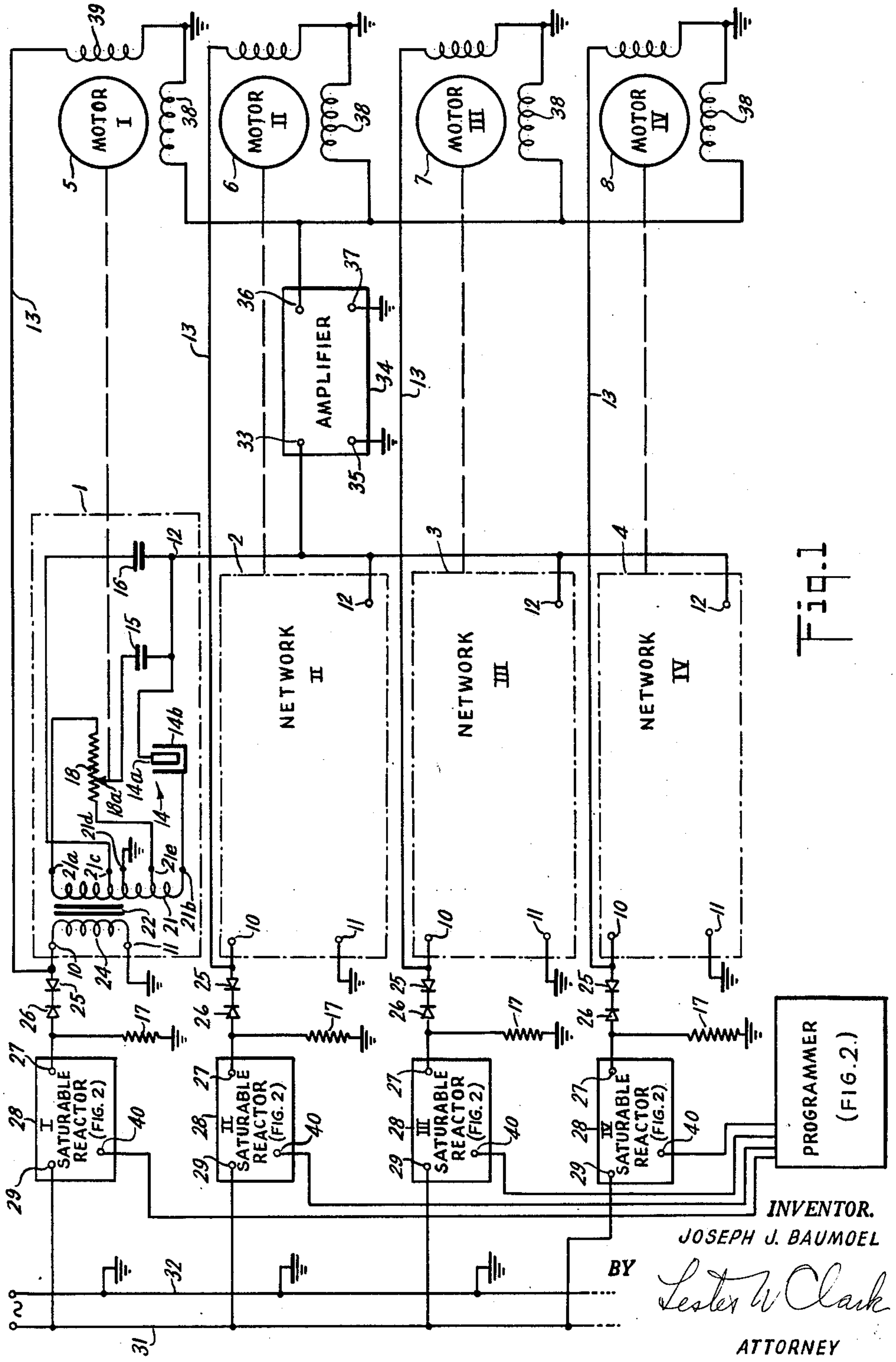
FIG. 1 is a wiring diagram of a multiplexing system constructed in accordance with the invention.

Referring to FIG. 1, there is shown a multiplexing system including four balanceable networks, 1, 2, 3 and 4, respectively, controlling four motors 5, 6, 7 and 8. Each individual or simplex system, including a network and its corresponding motors, is identified hereinafter by a particular Roman numeral I, II, III or IV. Other corresponding parts of the four systems are also identified with the respective Roman numerals. Only the system I will be described in detail, since the other systems are duplicates of that system.

The network I has a pair of input terminals 10 and 11 and an output terminal 12. A ground connection serves as a second output terminal. The network is illustrated as a simplified but typical modern commercial balancing network, since the details of the network are not material to the present invention. Network I is illustrated as a bridge circuit including capicitance elements 14, 15 and 16 in the respective arms of the bridge. The capacitance element 14 is illustrated as a probe for measuring the liquid level in a tank and comprises an inner cylindrical element 14*a* concentric with an outer cylindrical element 14*b*. These elements are immersed in an upright position in the tank so that the liquid rises between the elements and varies the capacitance of the unit.

A transformer 22 has its primary winding 24 connected between the input terminals 10 and 11. The secondary winding 21 of transformer 22 has end terminals 21*a* and 21*b* and intermediate taps 21*c*, 21*d* and 21*e*. A rebalancing slidewire resistor 18 is connected between terminal 21*a* and tap 21*c*. The slider 18*a* of the resistor 18 is connected through capacitor 15 to network output terminal 12. Capacitor 16 is connected between tap 21*c* and output terminal 12. Tap 21*d* is grounded. Capacitance element 14 is connected between terminal 21*b* and output terminal 12. The slider 18*a* is driven along the resistor 18 by a suitable operative connection to the motor 5. This connection is indicated by a dashed line in the drawing.

Figure 2:
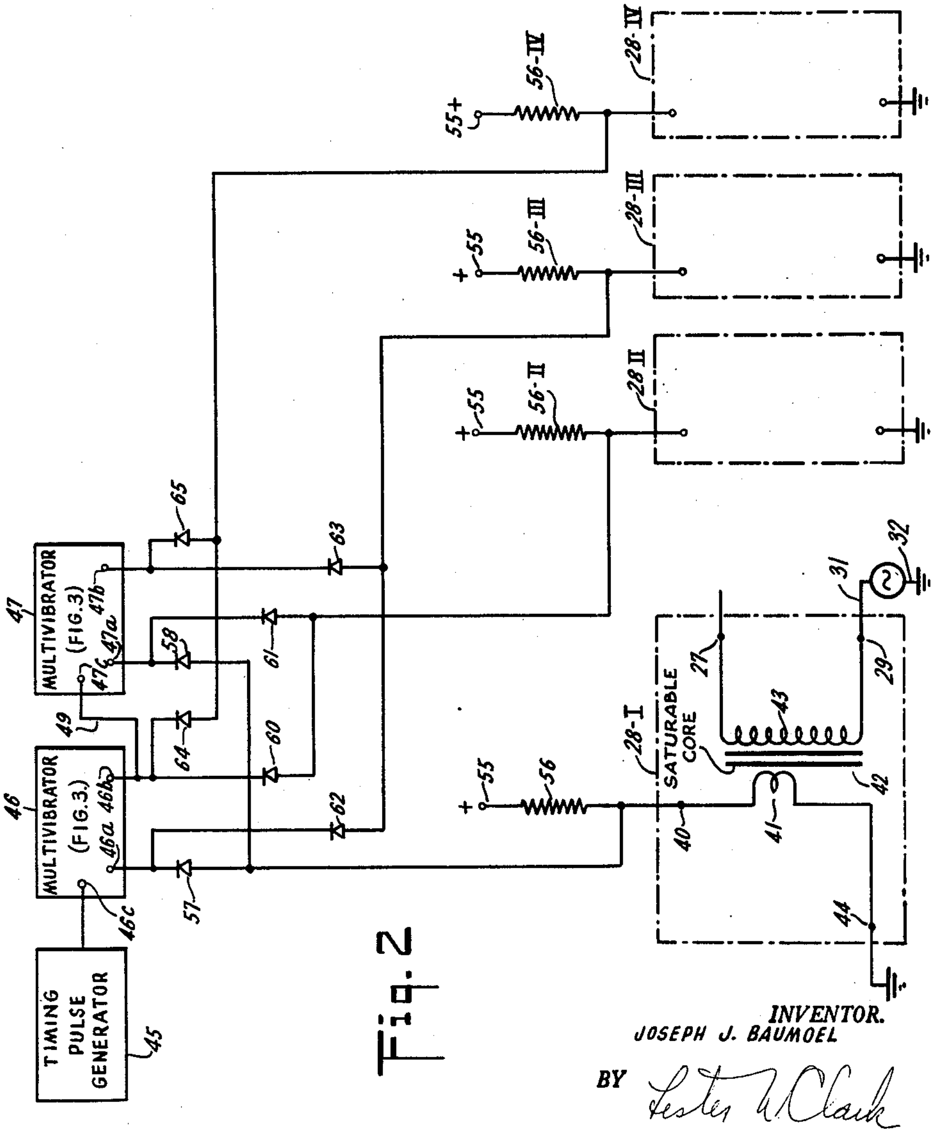
FIG. 2 is a wiring diagram of a programing circuit shown schematically in the circuit of FIG. 1.

Input terminal 10 is connected through two opposed Zener diodes 25 and 26 to an output terminal 27 of a saturable reactor 28, and to a resistor 17 whose opposite terminal is grounded. The reactor 28 (see FIG. 2) has a power input terminal 29 connected to an alternating current supply line 31. The other alternating current supply line, shown at 32, is grounded.

The output terminal 12 of network 1 is connected to an input terminal 33 of an amplifier 34 having another input terminal 35 which is grounded. Input terminal 33 is connected to the output terminals 12 of all four of the networks, in parallel. Amplifier 34 has output terminals 36 and 37, the latter being grounded. Output terminal 36 is connected in parallel to one terminal of the variable phase winding 38 of all four of the motors. Each of the four motors also has a fixed phase winding 39 having one terminal connected through a wire 13 to a suitable source of power connected to the output side of the Zener diodes 25 and 26. This source of power is shown, by way of example, as the input terminal 10, although in some instances it might be desirable to use a terminal of secondary 21 or a tap on either the primary or secondary. The other terminals of windings 38 and 39 are connected together and grounded.

*FIG. 2*

Each of the saturable reactors 28 has a control input terminal 40. One of the reactors is illustrated diagrammatically in FIG. 2 as having an input winding 41 and an output winding 43. Output winding 43 is connected between a power output terminal 27 and a power input terminal 29. A suitable source of alternating electrical energy is connected between power input terminal 29 and ground.

Many forms of saturable core reactors are known in the art. The particular form illustrated is selected for purposes of simplicity and ease of illustration. It will readily be recognized by those skilled in the art that many other equivalent forms are usable.

A source of timing pulses, generally indicated at 45, is connected to a cascaded chain of multivibrators 46, 47, arranged to serve as a binary counter. Each multivibrator has two complementary output terminals identified by *a* and *b* reference characters respectively, e.g. terminals 46*a* and 46*b*, and an input terminal identified by a *c* reference character, e.g. 46*c*. The *b* output terminal of each multivibrator is connected to the *c* input terminal of the following multivibrator in the chain. In its normal or "off" state, each multivibrator is stable in a condition such that its *a* output terminal is at a particular potential, termed hereinafter the negative potential, and its *b* ouput terminal is at a different predetermined potential, hereinafter termed the positive potential. It should be understood that both of these potentials may be positive, or both negative, or one of them may be zero, depending upon the choice of circuit elements. It is only necessary that the two potentials be distinctly separated in value, so that one is more positive than the other. The terms "negative" and "positive" as applied herein to these output potentials of the multivibrator, are relative. Upon receipt of one input pulse, multivibrator 46 reverses the potential conditions at its output terminals. Upon receipt of the next input pulse, multivibrator 46 again reverses the potential conditions at its output terminals, restoring their original conditions. Multivibrator 47 is arranged to respond to positive going pulses only, and so its output potentials are shifted only in response to every other input pulse at terminal 46*c*. The multivibrator 47 thus goes through one cycle of change of its output potentials for every two cycles of change of the output potentials of multivibrator 46, in other words for every four input pulses from the generator 45. A suitable circuit for use in the block 47 is that shown in the U.S. patent to Henle et al., No. 2,861,200, issued November 18, 1958. See particularly the circuit of FIG. 1 of the Henle et al. patent in which figure input terminal 1 corresponds to the input terminals 46*c* and 47*c* of the present application. Output terminals in FIG. 1 of Henle et al. correspond respectively to output terminals 46*a*, 47*a* and 46*b*, 47*b* of the present application.

Figure 3:
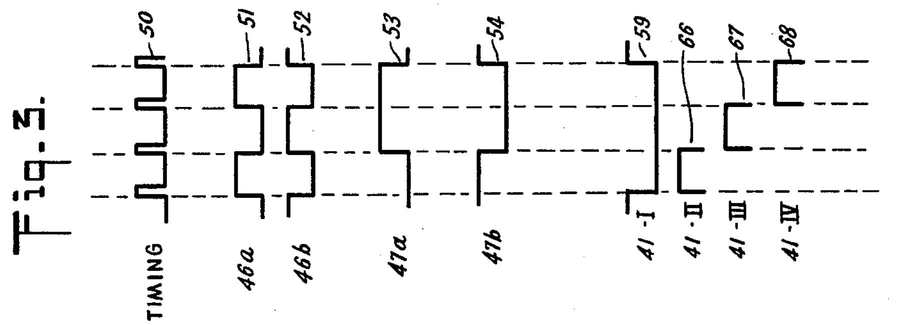
FIG. 3 is a timing chart showing the sequence of operation of the programing circuit.

The variations of the output potentials of the multivibrators 46 and 47 are illustrated diagrammatically in FIG. 3 where line 50 represents the timing pulses from the source 46, and lines 51, 52, 53 and 54 respectively represent the potentials at the multivibrator output terminals 46*a*, 46*b*, 47*a* and 47*b*.

When coil 41 is not energized, coil 43 acts as a high impedance choke and only a very small current flows through it. When coil 41 is energized, the core 42 is saturated, the impedance of coil 43 is relatively low, and a substantial current flows through it. The supply of current to the control winding 41 of the reactor 28–I is controlled by an AND circuit including a source of direct current having a positive terminal 55, a resistor 56, and a pair of diodes 57 and 58. Resistor 56 is connected between terminal 55 and control input terminal 40. Diodes 57 and 58 are respectively connected between terminal 40 and output terminals 46*a* and 47*a*. When either or both of the terminals 46*a* or 47*a* is substantially more negative than the terminal 55, then current flows from terminal 55 through a resistor 56 and through one or the other or both of the diodes 57 and 58, which effectively shunt the control winding 41. When both of the terminals 46*a* and 47*a* are switched by the action of the multivibrators to potentials more positive than the terminal 55, then current cannot flow through the diodes 57 and 58, since they are reverse biased. Current thereupon flows from terminal 55 through resistor 56 and control winding 41, saturating the core of reactor 28–I and thereby reducing the impedance of coil 43 to a low value, whereupon a substantial current flow is delivered through diodes 26 and 25 to transformer 22 of network I and to winding 39 of motor I.

As shown in lines 51 and 53 of FIG. 3, terminals 46*a* and 47*a* are both negative only at the beginning and end of the time interval illustrated, so that winding 41–I is energized only at such times (see line 59).

The control input terminals of the other three saturable core reactors are connected through similar AND circuits to different combinations of output terminals of the multivibrator counting chain. The AND circuit for reactor 28–II includes two diodes 60 and 61 connected to output terminals 46*b* and 47*a*. The control winding for reactor 28–III is connected through diodes 62 and 63 respectively to output terminals 46*a* and 47*b* of the counting chain. The control winding of reactor 28–IV is connected through diodes 64 and 65 to output terminals 46*b* and 47*b* of the counting chain.

Referring to FIG. 3, it may be seen that the respective control windings are energized at different times as illustrated by the lines 59, 66, 67 and 68 respectively.

In the arrangement shown, one control winding turns on at the same time that another control winding turns off. If, in a particular installation, this arrangement is found to be objectionable, it is possible to use more stages in the counting chain and avoid the use of some of the output terminal combinations for the AND circuit inputs. For example, in a system using only two reactors, the output terminal combinations represented by the lines 66 and 68 could be omitted, so that the "on" times of the respective reactors would be spaced apart by finite intervals.

Each saturable reactor produces a high output impedance when its control winding is deenergized, so that a relatively small potential appears between terminal 27 and ground. Two parallel paths are provided between terminal 27 and ground, one through the resistor 17 and the other through the Zener diodes 25, 26 and winding 24 in series. In the latter path, the impedance of the diodes 25, 26 is very high as compared to that of winding 24, so that any potential appearing between terminal 10 and ground is of negligible amplitude.

The Zener diodes 25 and 26 are selected so that their reverse breakdown potentials are low as compared to the output potential of one of the saturable reactors when its control winding is energized, but high as compared to the reactor output potential when its control winding is deenergized. Consequently, when a saturable reactor is energized, its associated Zener diodes 25 and 26 break down to their low impedance states except when the output potential is in the neighborhood of zero. This momentary high impedance, which occurs twice every alternating current cycle, has no noticeable effect in the circuit. When reactor 28–I is energized, current is supplied to the network I and to the fixed phase winding 39 of motor 5. The variable phase winding 38 is supplied from the output of amplifier 34.

All the networks 2, 3 and 4 are connected in parallel to the input of the amplifier 33. Only the network I is supplying a potential to the amplifier input terminals. The networks II, III and IV at this time present to that potential an impedance which is high as compared to the amplifier input impedance. The networks II, III and IV therefore have no substantial effect on the output of network I. While the actual impedance of these three networks II, III and IV may have different values depending upon the respective variable conditions and the respective states of balance of the networks, nevertheless, their impedances are all so high as compared to the input impedance of the amplifier that they represent a relatively constant loading effect on the energized network I, and therefore do not adversely affect the operation of the I circuit.

Only one of the four fixed phase windings 39 is energized at any one time, and hence only that one motor can rotate. The variable phase windings of all the motors are energized from the amplifier output, but only the motor whose fixed phase winding has been selected for energization rotates. That motor drives the rebalancing slider 18*a* of its associated control network along the resistor 18 in a direction to rebalance the network 1, and also drives an associated indicator (not shown) to exhibit the variable quantity controlling the network (e.g., the quantity of liquid in the tank measured by the capacitor probe 14.) The other three motors remain stationary and their rebalancing sliders and indicators are not disturbed.

It may be seen that I have provided a multiplexing circuit in which a plurality of systems, each including a balanceable network and a controlled motor, are effectively energized one at a time, in sequence. The networks use a single amplifier to control all the motors and no moving contact switches are employed to provide the multiplex operation of the amplifier. It should be obvious that the invention may be extended to installations having many more than four systems.

While I have shown and described a preferred embodiment of my invention, other modifications thereof will readily occur to those skilled in the art, and I therefore intend my invention to be limited only by the appended claims.

I claim:

1. Multiplex apparatus, comprising:

(*a*) a plurality of transmitters, each having a power input and an output;

(*b*) a plurality of receivers corresponding in number to said plurality of transmitters;

(*c*) each receiver having two complementary power inputs and having a characteristic such that power must be supplied simultaneously to both inputs to energize the receiver effectively;

(*d*) a single amplifier having an input and an output;

(*e*) means continuously connecting all the transmitter outputs in parallel to the amplifier input, each transmitter having an output impedance high as compared to the amplifier input impedance;

(*f*) means continuously connecting one power input of each receiver in parallel to the amplifier output;

(*g*) power supply means;

(*h*) a plurality of variable impedance means corresponding in number to said plurality of transmitters, each variable impedance means having a power input, a control input and a power output;

(*i*) means connecting the power inputs of all the variable impedance means to the power supply means;

(*j*) means connecting the power output of each variable impedance means to a power input of a corresponding transmitter and to the other power input of a corresponding receiver;

(*k*) each said variable impedance means having:

(1) a high impedance between its power inputs and its power output and being ineffective to transmit power when no control impulse is received at its control input, and (2) a low impedance between its power input and its power output and being effective to transmit power, when a control impulse is received at its control input; and (*l*) sequential control means for successively transmitting control impulses to the control inputs, one at a time.

2. Multiplex apparatus as defined in claim 1, in which each transmitter comprises a balanceable electrical network, means responsive to a variable condition for unbalancing the network, and means for rebalancing the network; and each receiver comprises a motor and means driven by the motor for operating the rebalancing means of its associated transmitter.

3. Multiplex apparatus as defined in claim 2, in which each said motor is a two phase alternating current motor having two windings connected respectively to the two complementary power inputs.

4. Multiplex apparatus as defined in claim 1, in which each variable impedance means comprises:

(*a*) a saturable reactor having an output winding connected between the power input and the power output; and (*b*) a pair of Zener diodes having predetermined reverse breakdown potentials and connected with their polarities opposed, in series with the output winding and its load, to provide:

(1) a high impedance when the potential in the output winding is less than said reverse breakdown potential; and (2) a low impedance when the potential in the output winding is greater than said reverse breakdown potential.

5. Multiplex apparatus as defined in claim 1, in which said sequential control means comprises:

(*a*) a binary counter chain including a plurality of multivibrators, each having direct and complementary output terminals;

(*b*) a plurality of "and" circuits corresponding in number to said plurality of transmitters, each "and" circuit including:

(1) a plurality of inputs connected to an individual combination of said multivibrator output terminals; and (2) a single output connected to the control input of its associated variable impedance means; and (c) means for supplying a series of separated timing pulses to the binary counter chain.

References Cited in the file of this patent

UNITED STATES PATENTS

| | | |
|---|---|---|
| 1,947,255 | Franklin | Feb. 13, 1934 |
| 2,822,480 | Isborn | Feb. 4, 1958 |
| 2,835,884 | Markow | May 20, 1958 |
| 2,850,725 | Beaumont | Sept. 2, 1958 |
| 2,872,533 | Hubbard | Feb. 3, 1959 |
| 2,873,422 | Miller | Feb. 10, 1959 |
| 2,875,351 | Collins | Feb. 24, 1959 |
| 2,875,427 | Koppel | Feb. 24, 1959 |
| 2,891,723 | Newman | June 23, 1959 |
| 2,908,894 | Kienast | Oct. 13, 1959 |
| 2,910,236 | Harper | Oct. 27, 1959 |